(12) United States Patent
Kang et al.

(10) Patent No.: US 10,014,931 B2
(45) Date of Patent: Jul. 3, 2018

(54) METHOD AND SYSTEM FOR TRANSMITTING AND RECEIVING SIGNAL USING MULTIPLE FREQUENCY BANDS IN A WIRELESS COMMUNICATION SYSTEM

(75) Inventors: Hyun-Jeong Kang, Seoul (KR); Hyoung-Kyu Lim, Seoul (KR); Jung-Je Son, Seongnam-si (KR); Yeong-Moon Son, Yongin-si (KR); Sung-Jin Lee, Seoul (KR); Jae-Hyuk Jang, Suwon-si (KR); Jae-Hee Cho, Seoul (KR); Min-Hee Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1236 days.

(21) Appl. No.: 12/522,943

(22) PCT Filed: Jan. 11, 2008

(86) PCT No.: PCT/KR2008/000196
§ 371 (c)(1),
(2), (4) Date: Jun. 23, 2010

(87) PCT Pub. No.: WO2008/085009
PCT Pub. Date: Jul. 17, 2008

(65) Prior Publication Data
US 2012/0093007 A1    Apr. 19, 2012

(30) Foreign Application Priority Data

Jan. 13, 2007  (KR) ........................ 10-2007-0004039
Feb. 2, 2007   (KR) ........................ 10-2007-0011170
Apr. 20, 2007  (KR) ........................ 10-2007-0039063
May 9, 2007    (KR) ........................ 10-2007-0045242

(51) Int. Cl.
*H04B 7/26*    (2006.01)

(52) U.S. Cl.
CPC .................................. *H04B 7/2621* (2013.01)

(58) Field of Classification Search
None
See application file for complete search history.

(56) References Cited

U.S. PATENT DOCUMENTS

| | | | |
|---|---|---|---|
| 5,319,795 A * | 6/1994 | Hamabe et al. | 455/451 |
| 5,384,777 A * | 1/1995 | Ahmadi et al. | 370/337 |
| 5,644,576 A * | 7/1997 | Bauchot et al. | 370/437 |
| 5,940,763 A * | 8/1999 | Alperovich et al. | 370/337 |

(Continued)

FOREIGN PATENT DOCUMENTS

| CN | 1791274 A | 6/2006 |
|---|---|---|
| CN | 101156421 A | 4/2008 |

(Continued)

*Primary Examiner* — Chirag Shah
*Assistant Examiner* — Joshua Smith
(74) *Attorney, Agent, or Firm* — Jefferson IP Law, LLP

(57) ABSTRACT

A method for transmitting and receiving signals using multiple frequency band in a wireless communication system are provided, in which a BS determines whether an MS is to use a plurality of FAs, selects the plurality of FAs if it is determined that the MS is to use the plurality of FAs, transmits FA information about the selected FAs to the MS, and transmits and receives signals to and from the MS in the selected FAs.

19 Claims, 11 Drawing Sheets

(56) References Cited

U.S. PATENT DOCUMENTS

| | | | |
|---|---|---|---|
| 6,038,450 A * | 3/2000 | Brink et al. | 455/442 |
| 6,181,686 B1 * | 1/2001 | Hamalainen et al. | 370/347 |
| 6,400,952 B2 | 6/2002 | Kim et al. | |
| 6,445,924 B1 * | 9/2002 | Rasanen | 455/437 |
| 6,449,481 B1 * | 9/2002 | Kwon et al. | 455/437 |
| 6,519,457 B1 * | 2/2003 | Jiang et al. | 455/442 |
| 6,684,120 B1 | 1/2004 | Oku et al. | |
| 6,738,350 B1 * | 5/2004 | Gao et al. | 370/232 |
| 6,829,477 B1 * | 12/2004 | Lu et al. | 455/426.1 |
| 6,947,748 B2 * | 9/2005 | Li et al. | 370/208 |
| 6,963,545 B1 * | 11/2005 | Ho | 370/282 |
| 6,985,455 B1 * | 1/2006 | Heath et al. | 370/316 |
| 2002/0131455 A1 * | 9/2002 | Cioffi et al. | 370/503 |
| 2003/0031141 A1 * | 2/2003 | Schweinhart et al. | 370/316 |
| 2003/0035385 A1 * | 2/2003 | Walsh et al. | 370/316 |
| 2004/0053615 A1 * | 3/2004 | Kim et al. | 455/436 |
| 2004/0185852 A1 * | 9/2004 | Son | H04W 36/12 455/438 |
| 2005/0032537 A1 | 2/2005 | Miyashita | |
| 2005/0096051 A1 * | 5/2005 | Lee | H04W 36/0055 455/438 |
| 2005/0159162 A1 * | 7/2005 | Park | 455/450 |
| 2005/0197132 A1 * | 9/2005 | Lee | H04L 5/0062 455/436 |
| 2005/0197133 A1 | 9/2005 | Hong et al. | |
| 2005/0254457 A1 * | 11/2005 | Jung et al. | 370/328 |
| 2005/0260999 A1 * | 11/2005 | Csapo | 455/450 |
| 2005/0277415 A1 * | 12/2005 | Hamalainen et al. | 455/436 |
| 2005/0282551 A1 | 12/2005 | Tandai et al. | |
| 2006/0003799 A1 | 1/2006 | Dawood et al. | |
| 2006/0009228 A1 * | 1/2006 | Kang et al. | 455/450 |
| 2006/0013182 A1 * | 1/2006 | Balasubramanian et al. | 370/343 |
| 2006/0030322 A1 * | 2/2006 | Kim et al. | 455/436 |
| 2006/0039319 A1 * | 2/2006 | Lee et al. | 370/328 |
| 2006/0073827 A1 | 4/2006 | Vaisanen et al. | |
| 2006/0089144 A1 * | 4/2006 | Kim et al. | 455/439 |
| 2006/0159018 A1 * | 7/2006 | Park | 370/235 |
| 2006/0223574 A1 | 10/2006 | Chandra | |
| 2006/0229075 A1 * | 10/2006 | Kim et al. | 370/331 |
| 2006/0246906 A1 * | 11/2006 | Vaittinen et al. | 455/442 |
| 2006/0281461 A1 * | 12/2006 | Kwun et al. | 455/436 |
| 2007/0010250 A1 * | 1/2007 | Bosch | H04W 36/0011 455/436 |
| 2007/0010251 A1 * | 1/2007 | Cho et al. | 455/436 |
| 2007/0223427 A1 * | 9/2007 | Nakatsugawa | 370/337 |
| 2008/0165736 A1 * | 7/2008 | Zhao et al. | 370/331 |
| 2008/0253341 A1 * | 10/2008 | Cordeiro et al. | 370/338 |
| 2008/0304449 A1 * | 12/2008 | Sung | 370/329 |
| 2009/0275337 A1 * | 11/2009 | Maeda et al. | 455/442 |
| 2009/0285163 A1 * | 11/2009 | Zhang et al. | 370/329 |
| 2010/0130199 A1 * | 5/2010 | Piercy et al. | 455/434 |
| 2012/0093007 A1 * | 4/2012 | Kang et al. | 370/329 |

FOREIGN PATENT DOCUMENTS

| | | |
|---|---|---|
| EP | 1 655 880 A2 | 5/2006 |
| EP | 1 686 821 A1 | 8/2006 |
| JP | 2005-057550 A | 3/2005 |
| KR | 10-0733511 B1 | 7/2007 |
| WO | 02/093839 A2 | 11/2002 |
| WO | 2006/031488 A2 | 3/2006 |
| WO | 2006/107965 A1 | 10/2006 |

* cited by examiner

METHOD AND SYSTEM FOR TRANSMITTING AND RECEIVING SIGNAL USING MULTIPLE FREQUENCY BANDS IN A WIRELESS COMMUNICATION SYSTEM

CROSS-REFERENCE TO RELATED PATENT APPLICATION

This application claims the benefit under 35 U.S.C. § 119(a) of a Korean Patent Application filed in the Korean Intellectual Property Office on Jan. 13, 2007 and assigned Serial No. 10-2007-0004039, a Korean Patent Application filed in the Korean Intellectual Property Office on Feb. 2, 2007 and assigned Serial No. 10-2007-0011170, a Korean Patent Application filed in the Korean Intellectual Property Office on Apr. 20, 2007 and assigned Serial No. 10-2007-0039063, and a Korean Patent Application filed in the Korean Intellectual Property Office on May 9, 2007 and assigned Serial No. 10-2007-0045242, the entire disclosure of which is hereby incorporated by reference.

BACKGROUND OF THE INVENTION

1. Field of the Invention

The present invention generally relates to a wireless communication system. More particularly, the present invention relates to a method and system for transmitting and receiving a signal in multiple frequency bands.

2. Description of the Related Art

The development of wireless communication systems is a driving force behind increasing demands for various types of services and a large amount of service data. To satisfy the demands, broadband wireless communication systems have emerged. Limited frequency resources of the wireless communication systems leads to limited frequency bands available to the broadband wireless communication systems. Nevertheless, the demand for frequency bands is increasing to provide broadband services.

FIG. 1 illustrates a single-frequency band support structure and a two-frequency band support structure in a conventional wireless communication system.

In a wireless communication system, particularly a broadband wireless communication system based on Institute of Electrical and Electronics Engineers (IEEE) 802.16, a Base Station (BS) manages one or more Frequency Assignments (FAs) and provides services to Mobile Stations (MSs) in the FA or FAs.

Referring to FIG. 1, an MS 100 can move from a first FA 120 (FA1) to a second FA 140 (FA2). If the MS 100 operates in only one FA or the two FAs 120 and 140 are operated by different BSs, the MS 100 receives a service in FA2 by inter-FA handover.

As compared to the MS 100, if an MS 150 is capable of operating in two or more FAs or the same BS operates two FAs 160 and 180 (FA1 and FA2), the MS 150 can receive a service in the FAs 160 and 180. Transmission and reception of signals between the MS and the BS in multiple frequency bands facilitates high-speed, large-data data transmission and reception. However, no procedures have been agreed between the MS and the MS so far for using multiple frequency bands between them. Moreover, there is no technique for specifying an FA in which the MS will communicate after an inter-FA handover or network entry and network re-entry.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a method for enabling use of multiple frequency bands in a wireless communication system.

Another aspect of exemplary embodiments of the present invention is to provide a method and system for efficiently using frequency resources in a wireless communication system.

In accordance with an aspect of exemplary embodiments of the present invention, there is provided a method for transmitting and receiving signals in a BS in a wireless communication system, in which it is determined whether a n MS is to use a plurality of FAs selecting the plurality of FAs if it is determined that the MS is to use the plurality of FAs, FA information about the selected FAs is transmitted to the MS, and signals are transmitted to and received from the MS in the selected FAs.

In accordance with another aspect of exemplary embodiments of the present invention, there is provided a method for transmitting and receiving signals in an MS in a wireless communication system, in which a neighbor BS information message including FA information about a neighbor BS of the serving BS is received from a serving BS in a primary FA in current use for communications with the serving BS, total FAs managed by the serving BS and the neighbor BS are scanned, a handover is requested in the primary FA to the serving BS according to the scanning, a handover response message is received in the primary FA from the serving BS, a message including information about a final target BS in the primary FA is transmitted to the serving BS, network re-entry to the final target BS is performed, the final target BS is notified that the MS can transmit and receive signals in at least two FAs, and information about FAs to be used with the final target BS is exchanged.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and system for transmitting and receiving data in a plurality of frequency bands between a BS and an MS in a wireless communication system. For this purpose, the MS performs network entry or network re-entry by switching between an initial access frequency band and a primary band. The frequency bands can be FAs.

The initial access frequency band (hereinafter, default FA) is a FA that the MS uses during an initial access to the BS. That is, the MS communicates with the BS, starting from contention-based initial ranging to the BS in the default FA. The primary band (hereinafter, primary FA) is a main FA that the MS uses for communications with the BS among the plurality of FAs. The primary FA usually delivers control information required for data transmission to and reception from the BS. In accordance with the present invention, the MS performs initial ranging in the default FA and uses the default FA as the primary FA after the initial ranging.

Herein, an overlay mode is defined as a mode in which the MS and the BS can exchange data in a plurality of FAs. The overlay mode will be described in the context of an IEEE 802.16 communication system, for example, although the present invention is also applicable to other communication systems such as Mobile Worldwide Interoperability for Microwave Access (WiMAX) and Mobile WiMAX evolution.

Figure 1:
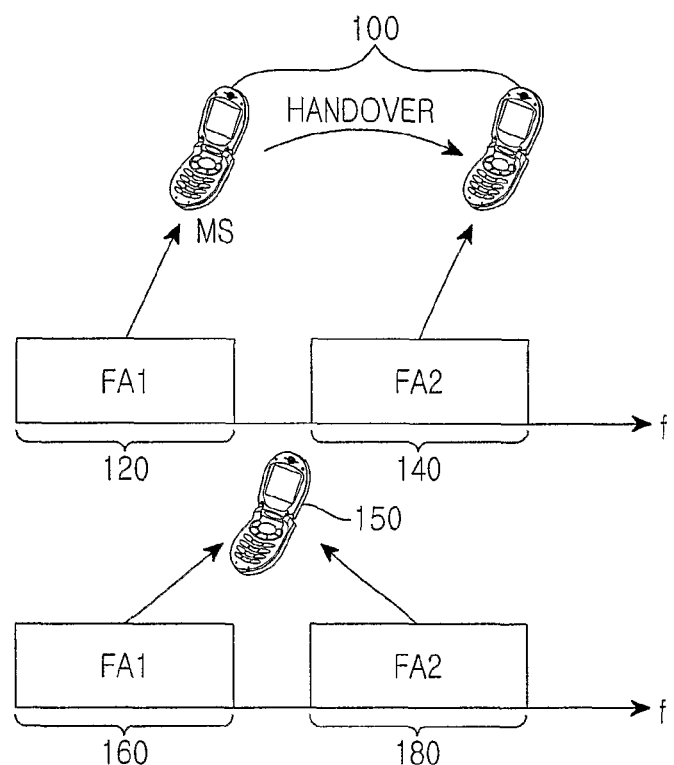
FIG. 1 illustrates a single-frequency band support structure and a two-frequency band support structure in a conventional wireless communication system.
Figure 2:
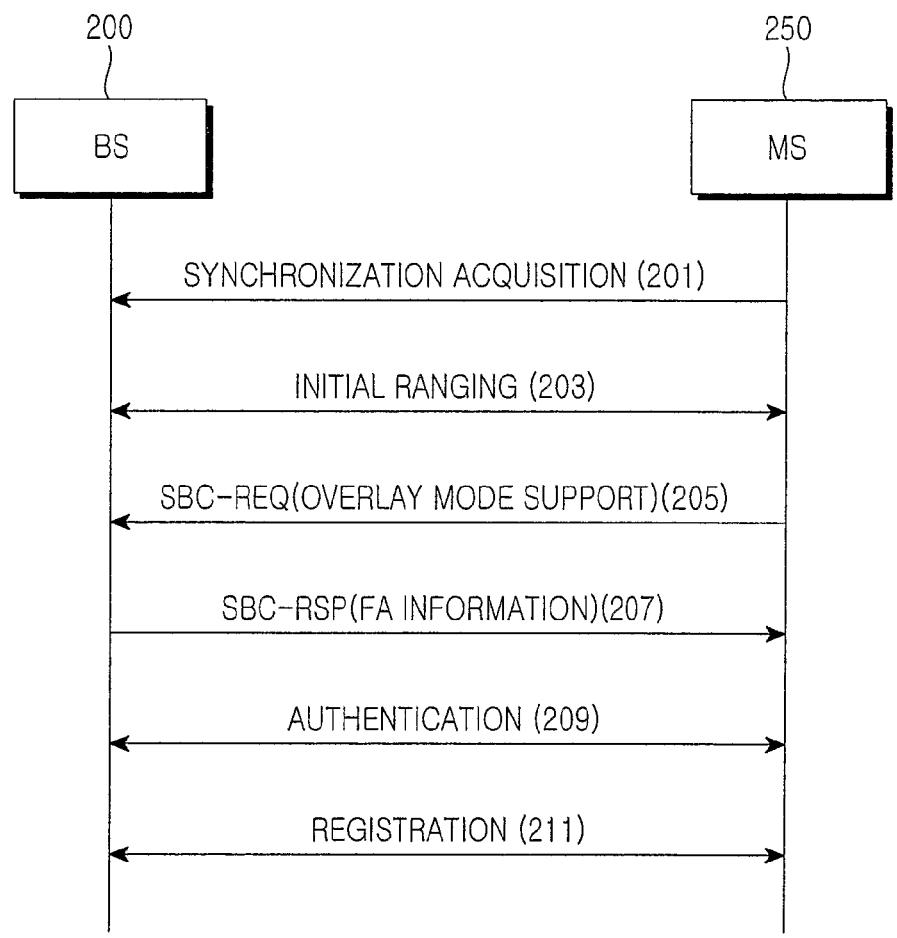
FIG. 2 is a signal diagram illustrating an initial network entry procedure for supporting an overlay mode according to an exemplary embodiment of the present invention.

FIG. 2 is a signal diagram illustrating an initial network entry procedure for supporting the overlay mode according to an exemplary embodiment of the present invention.

Referring to FIG. 2, an MS 250 acquires synchronization to a BS 200 in a particular FA in step 201. The BS 200 and the MS 250 perform initial ranging by exchanging ranging messages in step 203.

The MS 250 transmits a Subscriber station Basic Capability REQuest (SBC-REQ) message to the BS 200 in step 205. The SBC-REQ message may include information indicating whether the MS supports the overlay mode and, if the MS supports the overlay mode, information about the maximum number of supported FAs. The information can be included in a REGistration REQuest (REG-REQ) message during registration or any other control message related to the network entry.

The BS 200 replies to the MS 250 with a Subscriber station Basic Capability ReSPonse (SBC-RSP) message in step 207. The SBC-RSP message may include information indicating whether the BS supports the overlay mode and, if the BS supports the overlay mode, information about the number of FAs supported by the BS 200. The SBC-RSP message may further include information about all FA indexes managed by the BS 200, information about the center frequency of each FA, and synchronization information. Or the SBC-RSP message may further include information about only part of the FAs, that is, only as many FAs as supported by the MS 250.

The information included in the SBC-RSP message can be included in a REGistration ReSPonse (REG-RSP) message used during the registration or any other message related to the network entry, instead of the SBC-RSP message.

In steps 209 and 211, the BS 200 and the MS 250 perform authentication and registration.

Meanwhile, an MS that is in data communication with the BS in one or more FAs may need an FA change procedure. For this purpose, the MS should receive FA information from the BS. The BS can make a decision as to whether the MS needs to change its current FAs and as to which FAs are suitable for the MS, based on the quality measurement of each FA reported by the MS. The MS can report the quality measurement of each used FA on a Channel Quality Indictor CHannel (CQICH) allocated for the FA, or by a report message. When needed, the BS can control the MS to report the quality measurements of FAs unused for communications between the BS and the MS.

Figure 3:
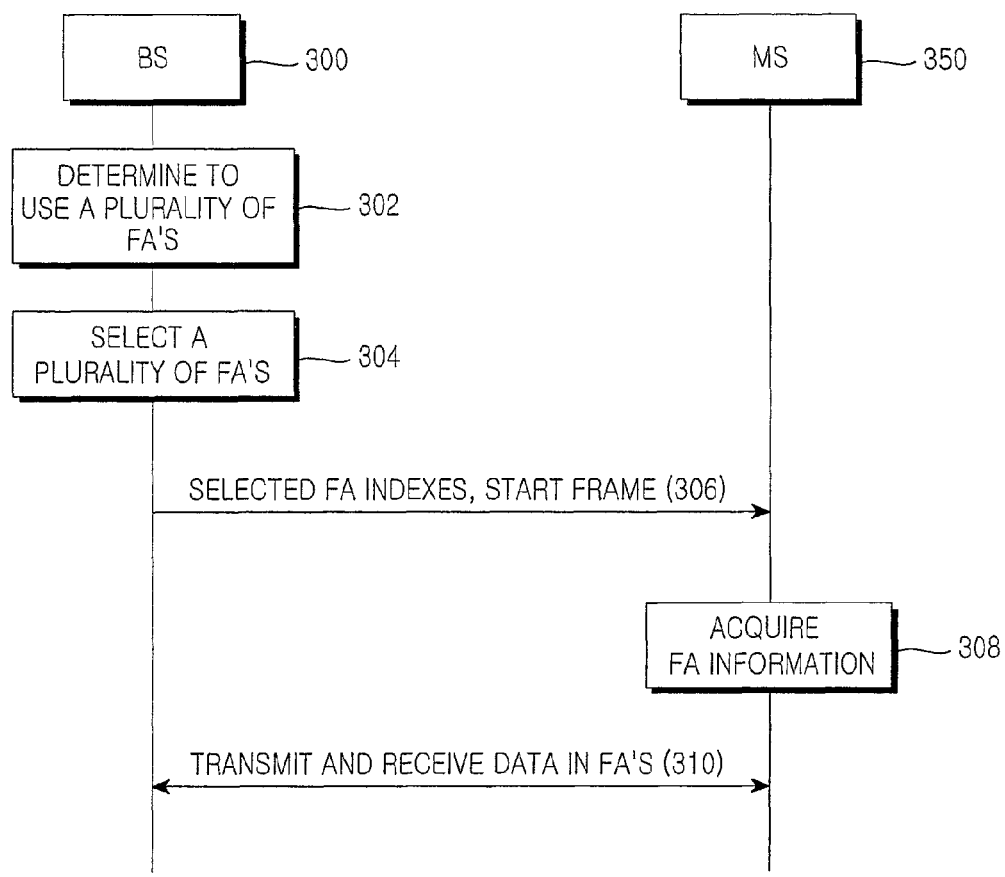
FIG. 3 is a signal diagram illustrating an operation for providing FA information by a BS in a wireless communication system according to an exemplary embodiment of the present invention.

FIG. 3 is a signal diagram illustrating an operation for providing FA information by the BS in a wireless communication system according to an exemplary embodiment of the present invention.

Referring to FIG. 3, a BS 300 determines whether to transmit and receive data to and from an MS 350 in a plurality of FAs in step 302. The BS 300 may determine to change FAs of the MS 350 according to a system-set rule in step 302 if the MS 350 is already communicating with the BS 300 in a plurality of FAs.

In either of the above cases, the BS 300 selects all or part of its current managed FAs in step 304. The selection is made taking into account the number of FAs supported by the MS 350.

In step 306, the BS 300 transmits to the MS 350 the indexes of the selected FAs and information about a start frame in which to start data transmission and reception in the selected FAs. The BS 300 may transmit to the MS 350 information about the index of an FA added to existing FAs used between the MS 350 and the BS 300 and information about a start frame in which to start data transmission and reception in the added FA. Also, the BS 300 may transmit to the MS 350 information about FAs which will not be used any longer among the existing FAs used between the BS 300 and the MS 350 and information about a time when the use of the FAs is discontinued. When an existing FA used for data transmission and reception is changed to a new FA, the BS 300 can transmit to the MS 350 information about the index of the new FA and information about a time when data transmission and reception start in the new FA.

The MS 350 acquires the FA information, that is, the FA indexes and the start frame information in step 308 and transmits and receives data to and from the BS 300 in the selected FAs in step 310.

After acquiring the FA information in step 308, the MS 350 may signal to the BS 300 in the selected FAs that it is ready for data transmission and reception in the selected FAs.

The BS 300 provides the FA information about the added FA (additional FA information), i.e. an FA index and start frame information to the MS 350 during network entry or upon completion of the network entry in the procedure of FIG. 3 by an SBC-RSP message, an REG-RSP message, or any other message related to the network entry, which carries FA information about the BS in the procedure of FIG. 2.

Figure 4:
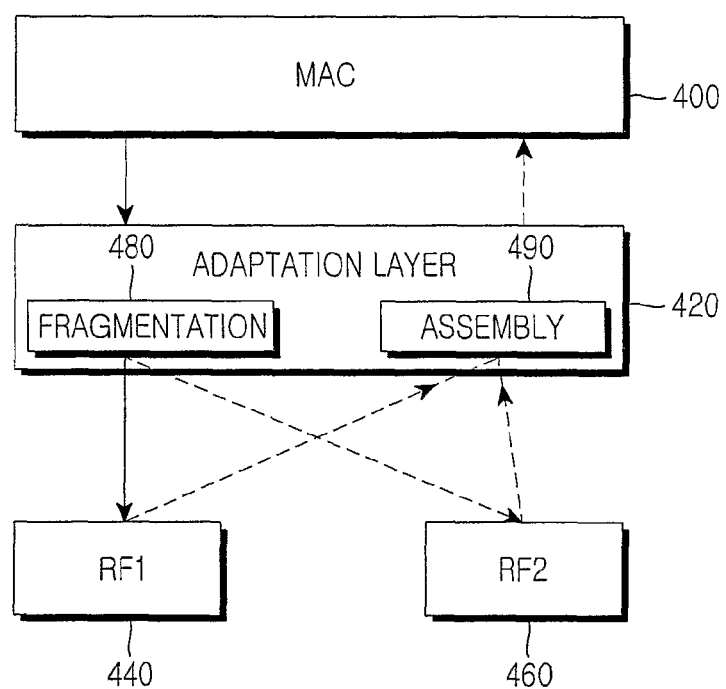
FIG. 4 illustrates a protocol stack for supporting a plurality of FAs according to an exemplary embodiment of the present invention.

FIG. 4 illustrates a protocol stack for supporting a plurality of FAs according to an exemplary embodiment of the present invention.

Referring to FIG. 4, a Medium Access Control (MAC) layer 400 performs MAC-layer operations defined in IEEE 802.16. That is, the MAC layer 400 converts data received from an upper layer to MAC-layer data and processes the MAC-layer data by mapping of an associated Connection Identifier (CID), band allocation, connection setup, connection maintenance, and MAC-layer data transmission scheduling.

An adaptation layer 420 controls data transmission and reception in each FA when an MS transmits and receives data in a plurality of FAs.

A physical layer includes first and second Radio Frequency (RF) modules 440 and 460 (RF1 and RF2). RF1 and RF2 transmit and receive physical-layer data in FAs.

The adaptation layer 420 will be described in more detail.

The adaptation layer 420 is under the MAC layer 400. It may include a fragmentation module 480 for fragmenting the MAC-layer data for transmission to RF1 connected to FA1 and RF2 connected to FA2, and an assembly module 490 for assembling physical-layer data received from RF1 and RF2 and transmitting the assembled data to the MAC layer 400. The adaptation layer 420 also determines an FA in which fragmented data is to be transmitted and received, manages control information about the quality measurement or transmit power of each FA, and manages ordering of the fragmented data.

As described above, the adaptation layer 420 should manage fragmentation information and assembly information about data. For example, when data is fragmented and transmitted in a plurality of FAs, the adaptation layer 420 can include FA index information in data to indicate an FA in which the data is transmitted or transmit the data in an FA according to a preset order without including the FA index information in the data. If the BS transmits FA information to the MS by an SBC-RSP message, for example, data can be transmitted and received in an FA order indicated by the SBC-RSP message.

Meanwhile, CIDs are allocated to the MS in a conventional manger irrespective of FAs used for the MS. That is, a basic CID, a primary management CID, and a secondary management CID are allocated to the MS during initial network entry. The MS may further be allocated a transport CID. As described before, even when an FA of the MS is changed, a connection of the MS can be identified by a CID allocated to the MS. If the MS transmits and receives data in a plurality of FAs, an FA in which the MS performs the initial network entry, a preset FA between the BS and the MS, or an explicitly signaled FA is set as a primary FA and the primary FA can be used for controlling each of the plurality of FAs or for transmission of signals for controlling the MS except data transmission in each FA. The BS can set any other FA than the primary FA as a new primary FA for communications with the MS. The new primary FA can be used for controlling each of the plurality of FAs or for transmission of signals for controlling the MS except data transmission in each FA. The primary FA can be changed according to the procedure illustrated in FIG. 3.

Figure 5:
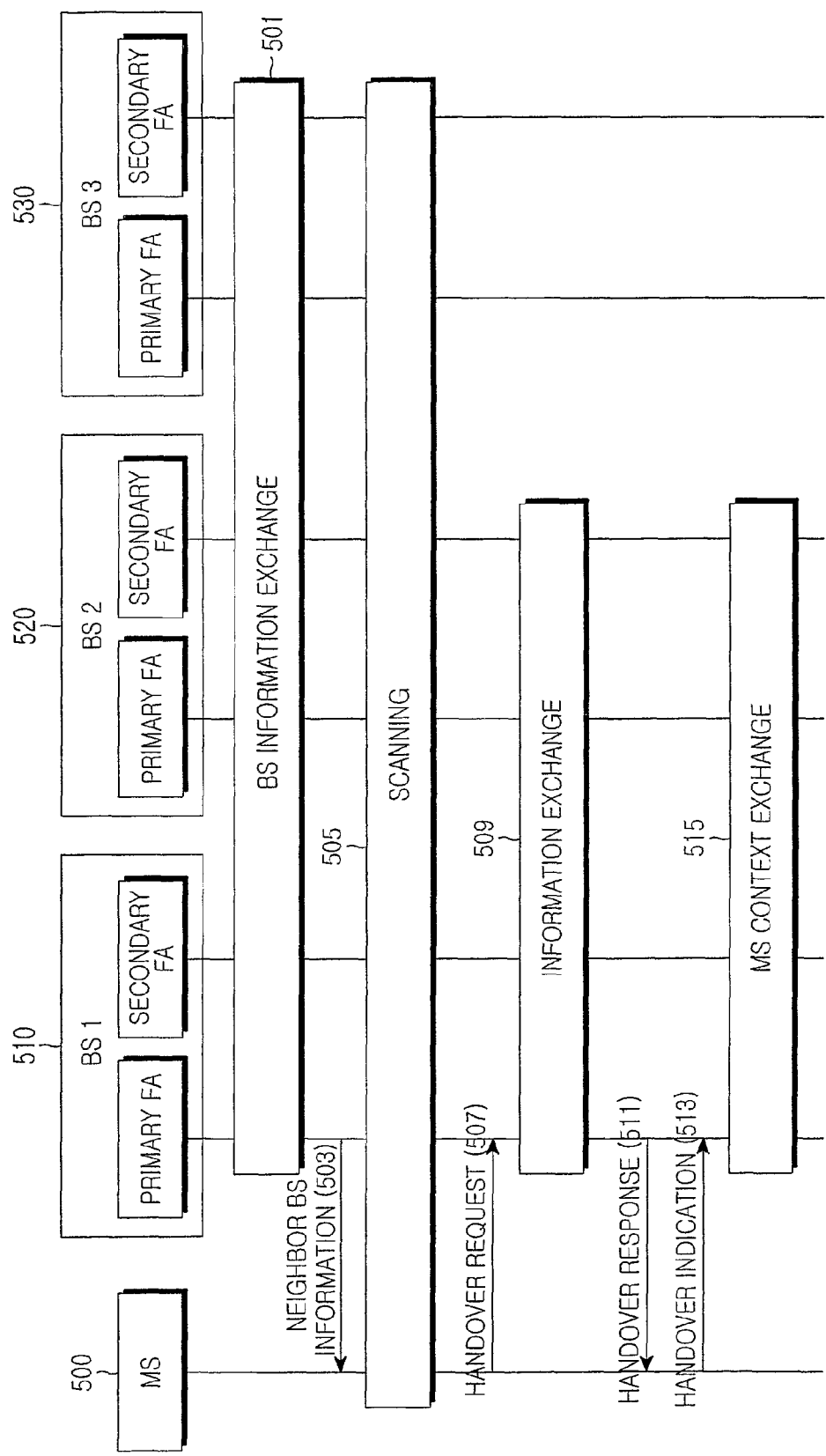
FIG. 5 is a diagram illustrating a signal flow for a handover operation of an MS supporting a plurality of FAs according to an exemplary embodiment of the present invention.

FIG. 5 is a diagram illustrating a signal flow for a handover operation of an MS supporting a plurality of FAs according to an exemplary embodiment of the present invention.

Referring to FIG. 5, a first BS 510 (BS1) is a serving BS for an MS 500 and second and third BSs 520 and 530 (BS2 and BS3) are neighbor BSs to the serving BS 510. A primary FA and a secondary FA for each BS are set from the perspective of the MS 500. In other words, FAs that the MS 500 has selected from among a plurality of FAs can be a primary FA and a secondary FA and the MS operates in the selected FAs. For example, the primary FA and the secondary FA that the MS 500 uses with BS1 may be in the same band as or in different bands from those of BS2 after handover.

BS1 exchanges BS information with BS2 and BS3 in step 501. The BS information of a BS may include information about FAs that the BS manages.

BS1 forms a neighbor BS information message including the FA information of BS2 and BS3 and transmits the neighbor BS information message to the MS 500 in the primary FA in step 503. The MS 500 scans the FAs managed by BS1, BS2 and BS3 based on the neighbor BS information message in step 505.

The MS 500 transmits a handover request message in the primary FA to BS 1 according to the scanning result in step 507. It is assumed herein that the handover request message indicates BS2 as an MS-selected target BS. A plurality of BSs can be selected as target BSs.

BS 1 exchanges information with BS 2 in step 509. The information may include information indicating whether the MS 500 supports the overlay mode, the maximum number of FAs supported by the MS 500, and service level information about the MS 500. The service level information is about a service level that the MS 500 can achieve when BS1 transmits data in all FAs used for communications between BS 1 and the MS 500 and a service level that the MS 500 can achieve when BS2 transmits data in all FAs supported for the MS 500.

BS1 transmits a handover response message including the information exchanged with BS2 to the MS 500 in the primary FA in step 511. As BS2 satisfies a handover condition, the MS 500 transmits to BS1 a handover indication message indicating that it will perform a handover to BS2 in step 513.

In step 515, BS1 transmits information about a context of the MS 500 to BS2. While not shown, the MS 500 and BS2 perform network re-entry. Meanwhile, the context information can be exchanged between BS1 and BS2 during the network re-entry.

During the network re-entry, the MS 500 may receive from BS2 information about whether the overlay mode will be used, and if the overlay mode will be used, information about a primary FA, the number of FAs supported in the overlay mode, FA information such as the indexes of the FAs or the central frequencies of the FAs, and a start frame in which the overlay mode starts. After the network re-entry, the MS 500 transmits and receives data in the primary FA and a secondary FA to and from BS2 as indicated by BS2. Meanwhile, the MS 500 can exchange FA information for use in a final target BS during the network re-entry.

While BS2 provides the MS 500 with the FA information for use in the overlay mode and the start frame information for the overlay mode in the above description, it can be further contemplated that the MS 500 determines to perform the overlay mode using the FA information received from BS2 and notifies BS2 that the overlay mode will be performed, rather than BS2 transmits the start frame information to the MS 500. The notification can be transmitted in the primary FA or a secondary FA in which the overlay mode will be performed.

In the illustrated case of FIG. 5, the MS 500 requests the handover. Instead, BS1 can request the handover. In this case, the handover is performed similarly to the procedure of FIG. 5, except that BS1 requests the handover to the MS 500.

If the signal quality of the secondary FA is decreased during communications between the MS and the BS in the primary FA and the secondary FA, the secondary FA can be replaced with a new secondary FA. If the MS does not receive a satisfactory communication service due to the decreased signal quality of the secondary FA, the BS can request a handover to another BS to the MS.

Conventionally, the MS completes ranging in a predetermined default FA. Yet, no procedure for determining an FA in which signals are to be transmitted and received after the ranging has been specified. In this context, a method for transmitting and receiving signals to and from the BS by the MS after the ranging will be described below.

Figure 6:
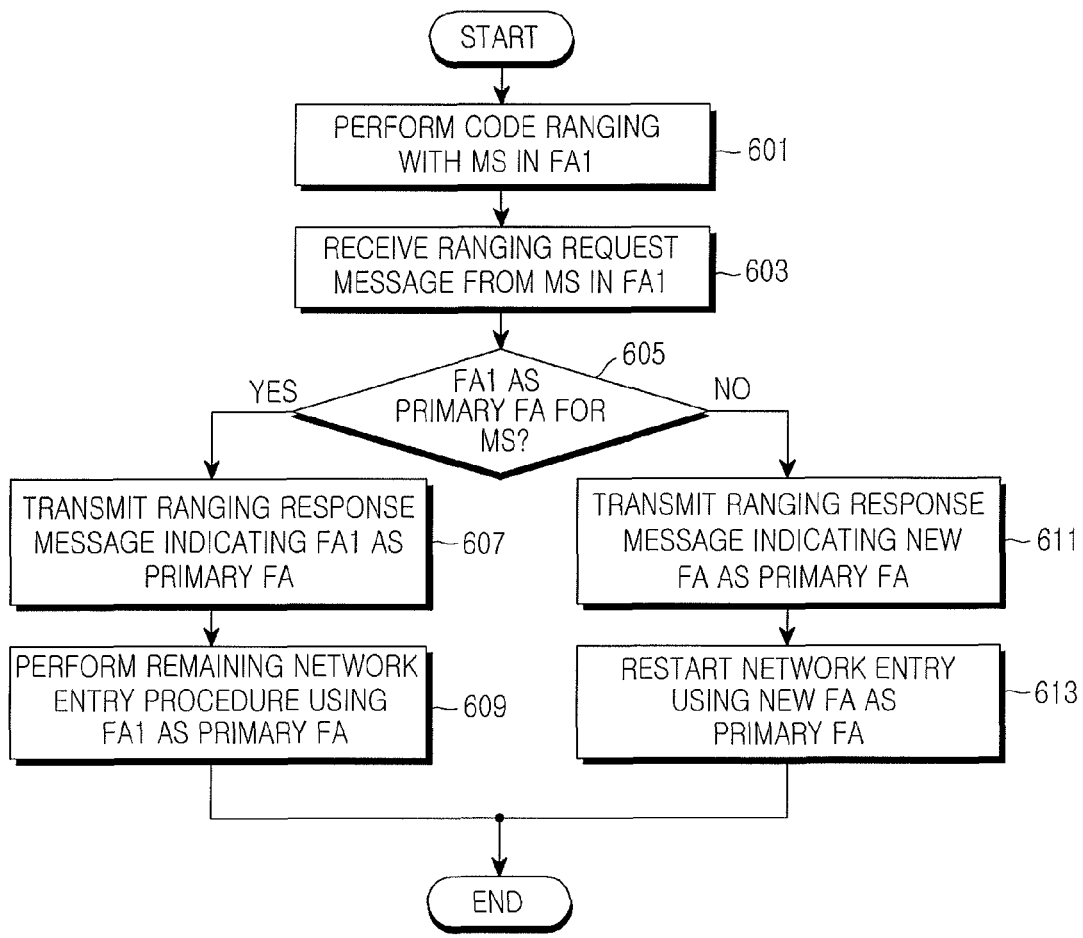
FIG. 6 is a flowchart of an operation for commanding the MS to change a default FA in the BS according to an exemplary embodiment of the present invention.

FIG. 6 is a flowchart of an operation for commanding the MS to change a default FA in the BS according to an exemplary embodiment of the present invention.

Referring to FIG. 6, the BS performs code ranging with the MS in a default FA that the MS has arbitrarily selected, FA1 in step 601. As the coding ranging is successful, the BS receives an initial ranging request message from the MS in FA1 in step 603. The initial ranging request message may include information about whether the MS supports the overlay mode. In the present invention, it is assumed that the MS can transmit and receive signals in the overlay mode.

In step 605, the BS determines whether the F1 can be used as a primary FA for the MS. The determination is made taking into account load balancing among a plurality of FAs or the processing overload of the MS. For example, if FA1 is in use as a primary FA for more MSs than a predetermined number, relative to other FAs of the BS, the BS should command the MS to use any other FA as the primary FA. That is, if the BS determines to use FA1 as the primary FA for the MS in step 605, it goes to step 607. Otherwise, the BS goes to step 611.

The BS transmits to the MS a ranging response message including information indicating FA1 as the primary FA of the MS in step 607 and performs the remaining network entry procedure in the default FA, FA1 in step 609. During the remaining network entry procedure, the BS provides the MS with information about a secondary FA for the MS. Upon completion of the network entry, the MS transmits and receives signals using the primary FA being FA1 and the secondary FA in the overlay mode.

Meanwhile, the BS transmits to the MS a ranging response message including information indicating a new FA as the primary FA of the MS in step 611 and re-starts the network entry in the new FA in step 613. That is, the MS restarts the network entry in the new FA, starting from initial code ranging. The new FA can be at once a default FA and a primary FA.

Figure 7:
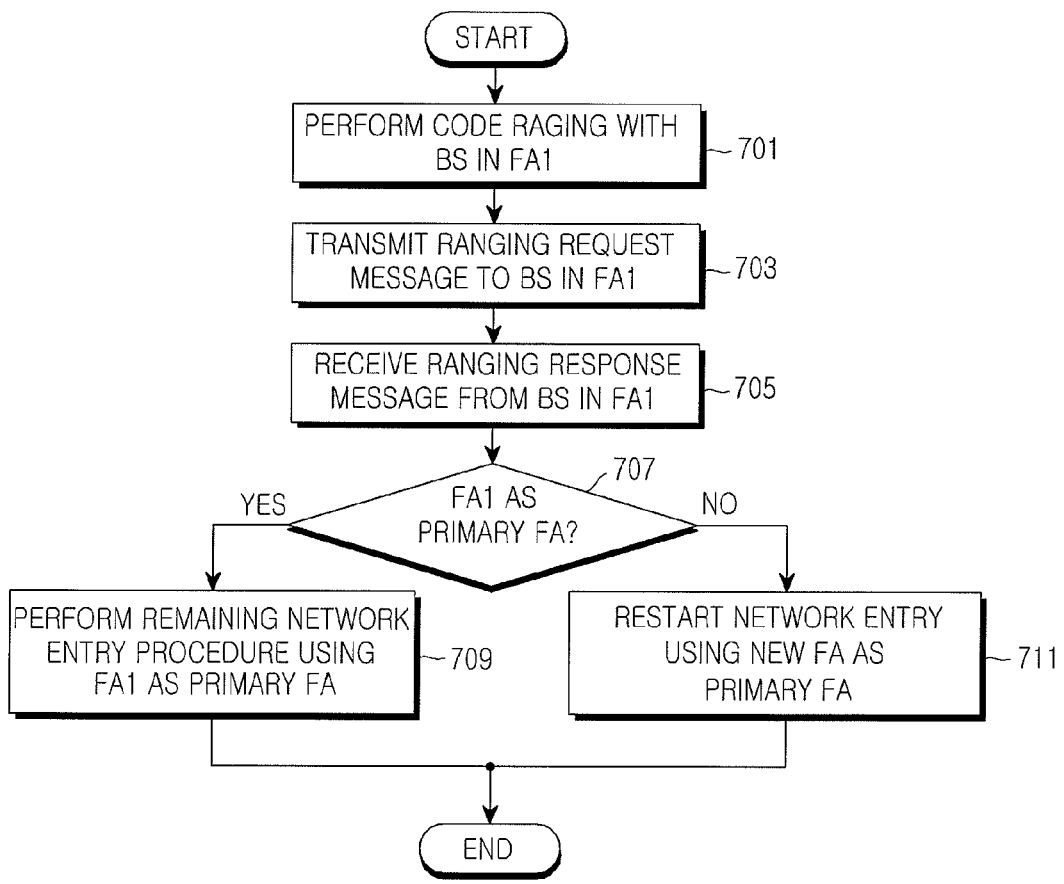
FIG. 7 is a flowchart illustrating a network entry operation of the MS when the MS receives a default FA change command according to an exemplary embodiment of the present invention.

FIG. 7 is a flowchart illustrating a network entry operation of the MS when the MS receives a default FA change command according to an exemplary embodiment of the present invention.

Referring to FIG. 7, the MS performs initial code ranging to the BS using FA1 as a default FA in step 701 and transmits a ranging request message to the BS in FA1 in step 703. The ranging request message includes information indicating whether the MS supports the overlay mode. Further, the ranging request message may include information about the number of FAs supported by the MS. The information about the number of supported FAs can be transmitted by an SBC-REQ message during network entry.

In step 705, the MS receives a ranging response message in FA1 from the BS. The MS determines whether the ranging response message includes information indicating FA1 as a primary FA in step 707. If the information indicating FA1 as a primary FA is included, the MS performs the remaining network entry procedure in FA1 in step 709. If information indicating another FA as a primary FA is included, the MS re-starts an initial network entry procedure in the new FA in step 711. Thus, the MS should restart from initial code ranging to the BS in the new FA.

Figure 8:
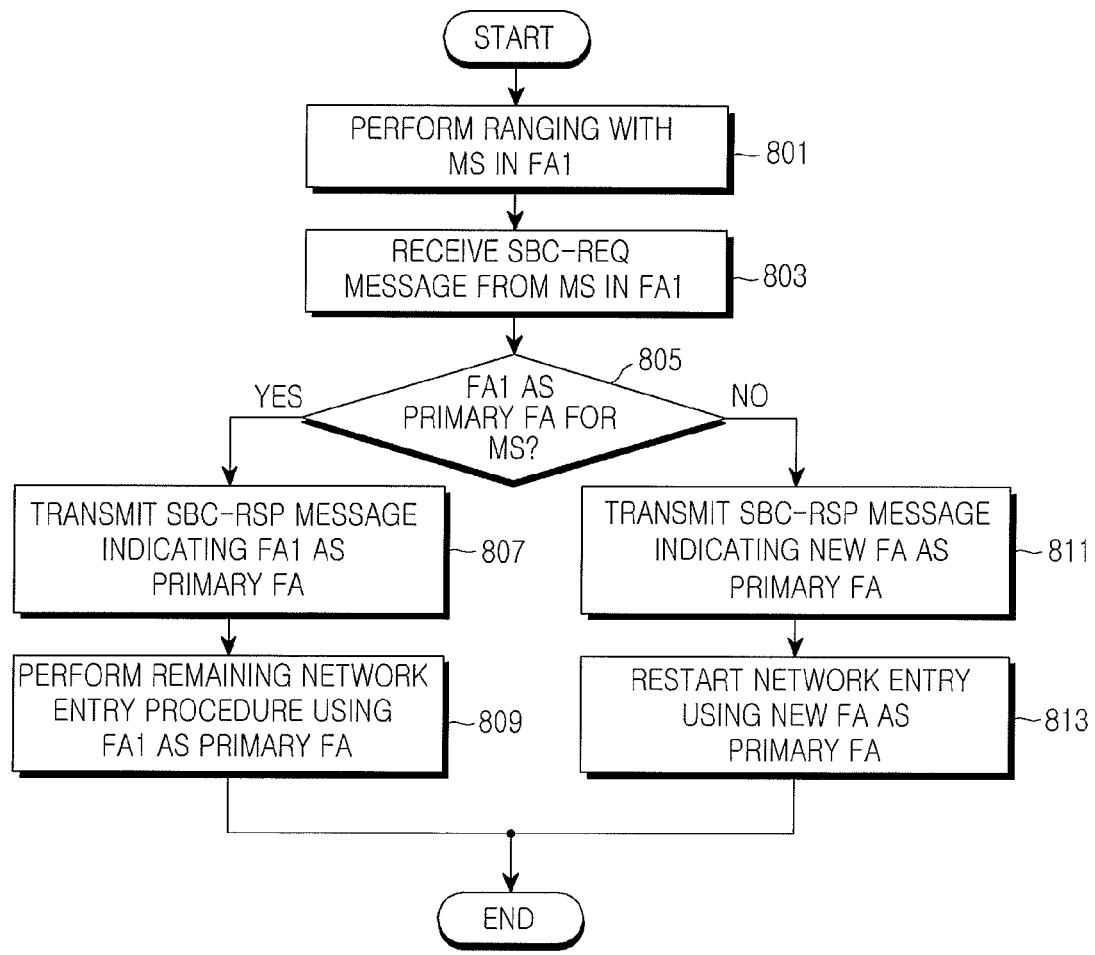
FIG. 8 is a flowchart of an operation for commanding the MS to change a default FA in the BS according to another exemplary embodiment of the present invention.

FIG. 8 is a flowchart of an operation for commanding the MS to change a default FA in the BS according to another exemplary embodiment of the present invention.

Referring to FIG. 8, the BS performs initial ranging with the MS in a default FA FA1 in step 801 and receives an SBC-REQ message from the MS in FA1 in step 803. The SBC-REQ message includes information indicating whether the MS supports the overlay mode. It is assumed in FIG. 8 that the MS supports the overlay mode.

In step 805, the BS determines whether to use FA1 as a primary FA for the MS, taking into account load balancing among FAs. If the BS determines to use FA1 as the primary FA of the MS, it transmits an SBC-RSP message including information indicating FA1 as the primary FA to the MS in step 807. The SBC-RSP message may include information about a secondary FA for the overlay mode of the MS. In step 809, the BS performs the remaining network entry procedure in FA1. Then, the BS transmits and receives signals to and from the MS using FA1 and the secondary FA in the overlay mode.

Meanwhile, if the BS determines to use a new FA as the primary FA of the MS in step 805, it transmits an SBC-RSP message including information about the new FA to the MS in step 811 and re-starts network entry with the MS in the new FA in step 813. That is, the BS re-starts from initial code ranging with the MS in the new FA.

Figure 9:
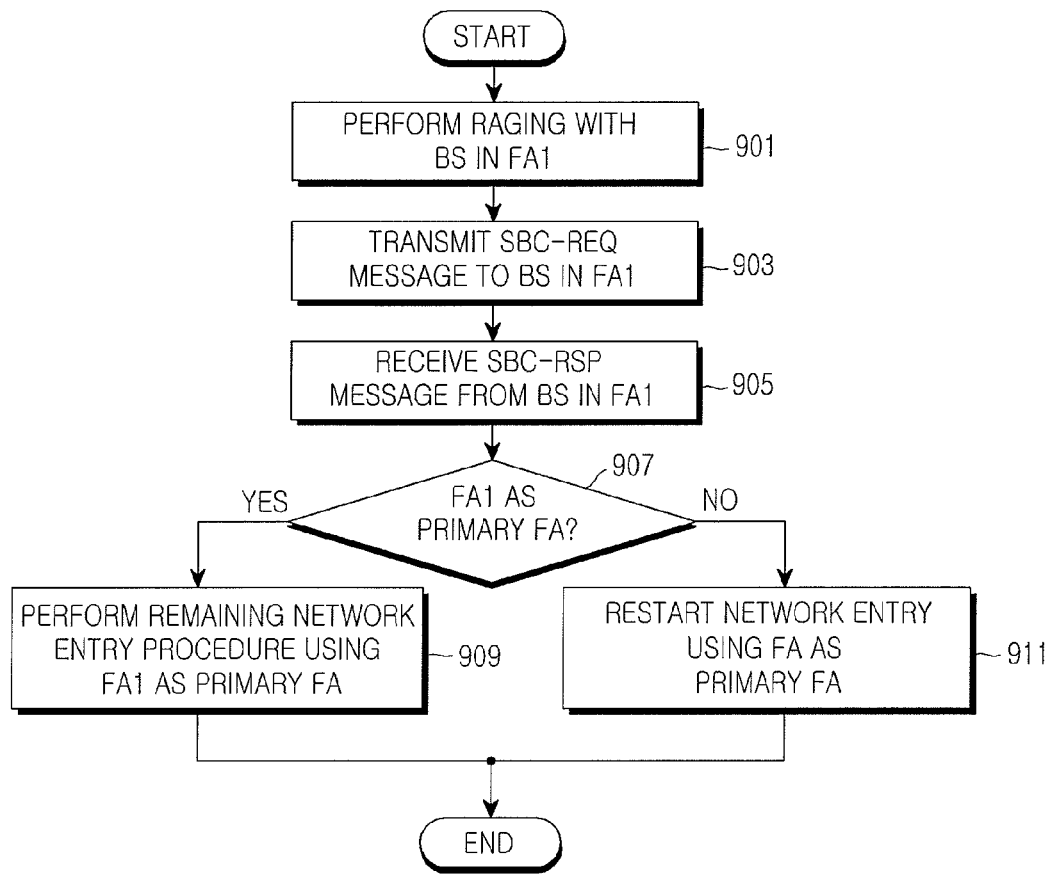
FIG. 9 is a flowchart of a network entry operation of the MS when the MS receives a default FA change command according to another exemplary embodiment of the present invention.

FIG. 9 is a flowchart of a network entry operation of the MS when the MS receives a default FA change command according to another exemplary embodiment of the present invention.

Referring to FIG. 9, the MS performs initial ranging with the BS in a default bad, FA1 in step 901 and transmits an SBC-REQ message to the BS in FA1 in step 903. In step 905, the MS receives an SBC-RSP message from the BS.

In step 907, the MS determines whether the SBC-RSP message includes information commanding change of the default FA from FA1 to a new FA. If there is no need to change the default FA, FA1, the MS continues the network entry with the BS in FA1 in step 909. On the other hand, if the MS is to change the default FA from FA1 to a new FA, it re-starts the network entry, starting from initial ranging in the new FA indicated by the BS in step 911.

Figure 10:
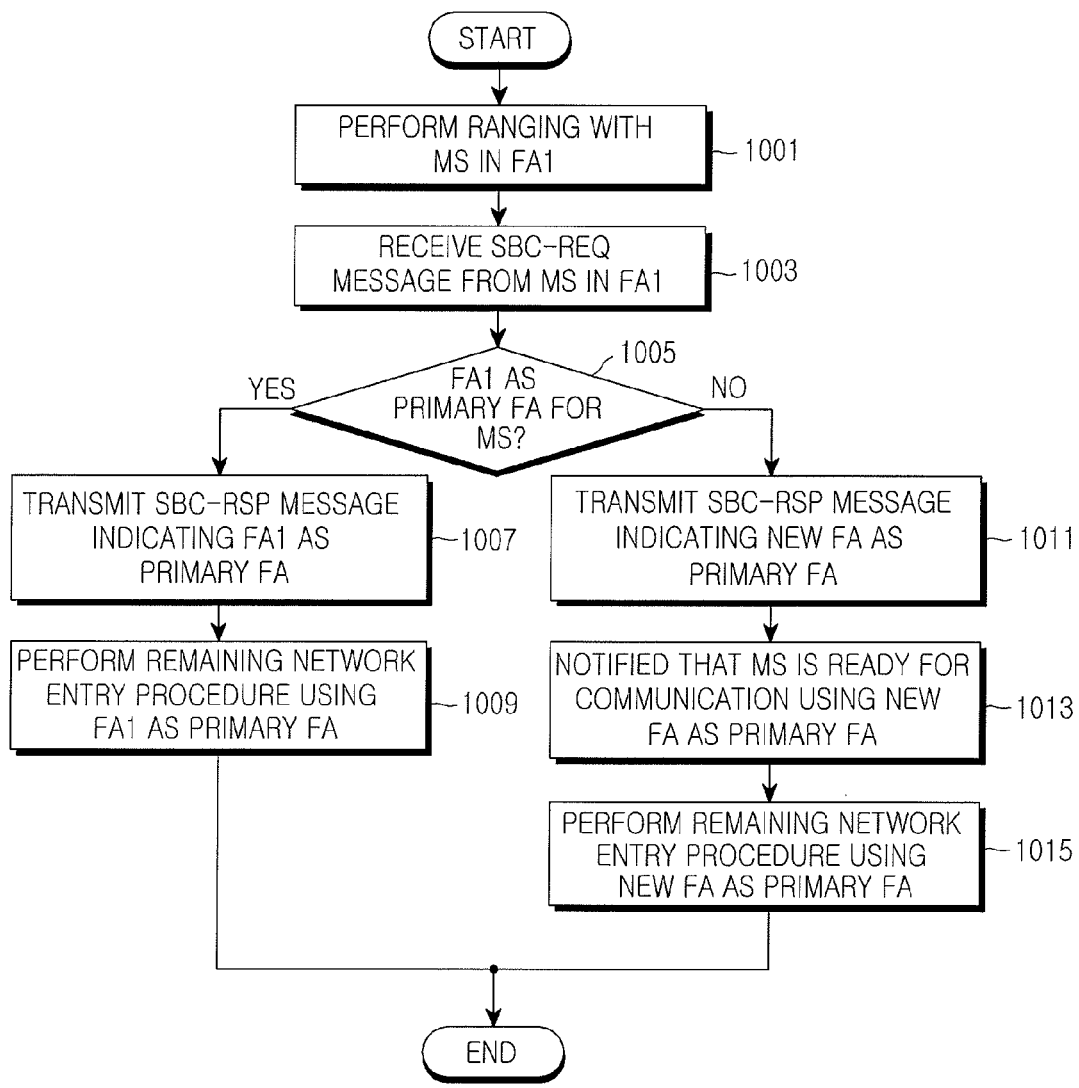
FIG. 10 is a flowchart of an operation for commanding the MS to change a default FA in the BS according to a third exemplary embodiment of the present invention.

FIG. 10 is a flowchart of an operation for commanding the MS to change a default FA in the BS according to a third exemplary embodiment of the present invention.

Referring to FIG. 10, the BS performs initial ranging with the MS in a default FA of the MS, FA1 in step 1001 and receives an SBC-REQ message from the MS in FA1 in step 1003. The SBC-REQ message may include information indicating whether the MS supports the overlay mode. It is assumed in FIG. 10 that the MS supports the overlay mode.

In step 1005, the BS determines whether to use FA1 as a primary FA for the MS, taking into account load balancing among FAs. If the BS determines to use FA1 as the primary FA of the MS, it transmits an SBC-RSP message including information indicating FA1 as the primary FA to the MS in step 1007. The SBC-RSP message may include information about a secondary FA for the overlay mode of the MS. In step 1009, the BS performs the remaining network entry procedure in FA1.

Meanwhile, if the BS determines to change the default FA in step 1005, it transmits an SBC-RSP message including information about a new FA as the primary FA to the MS in step 1011 and receives a signal indicating that the MS is ready for communications using the new FA as the default FA and the primary FA from the MS in step 1013. In step 1015, the BS performs the remaining network entry procedure with the MS in the new FA.

When the BS determines to change the default FA of the MS and provides information about a new FA as the default FA to the MS in step 1005, it can notify the MS of at least one of a ranging code or a ranging transmission area carrying the ranging code for use in ranging in the new default FA. The MS can perform ranging in the new FA using at least one of the ranging code and the ranging transmission area. This ranging is fast ranging different from contention-based initial ranging.

The allocated ranging code or ranging transmission area information facilitates fast ranging in the new default FA in the MS, and can be used for the MS to notify the BS of an access to the BS after changing the default FA as indicated by the BS.

Figure 11:
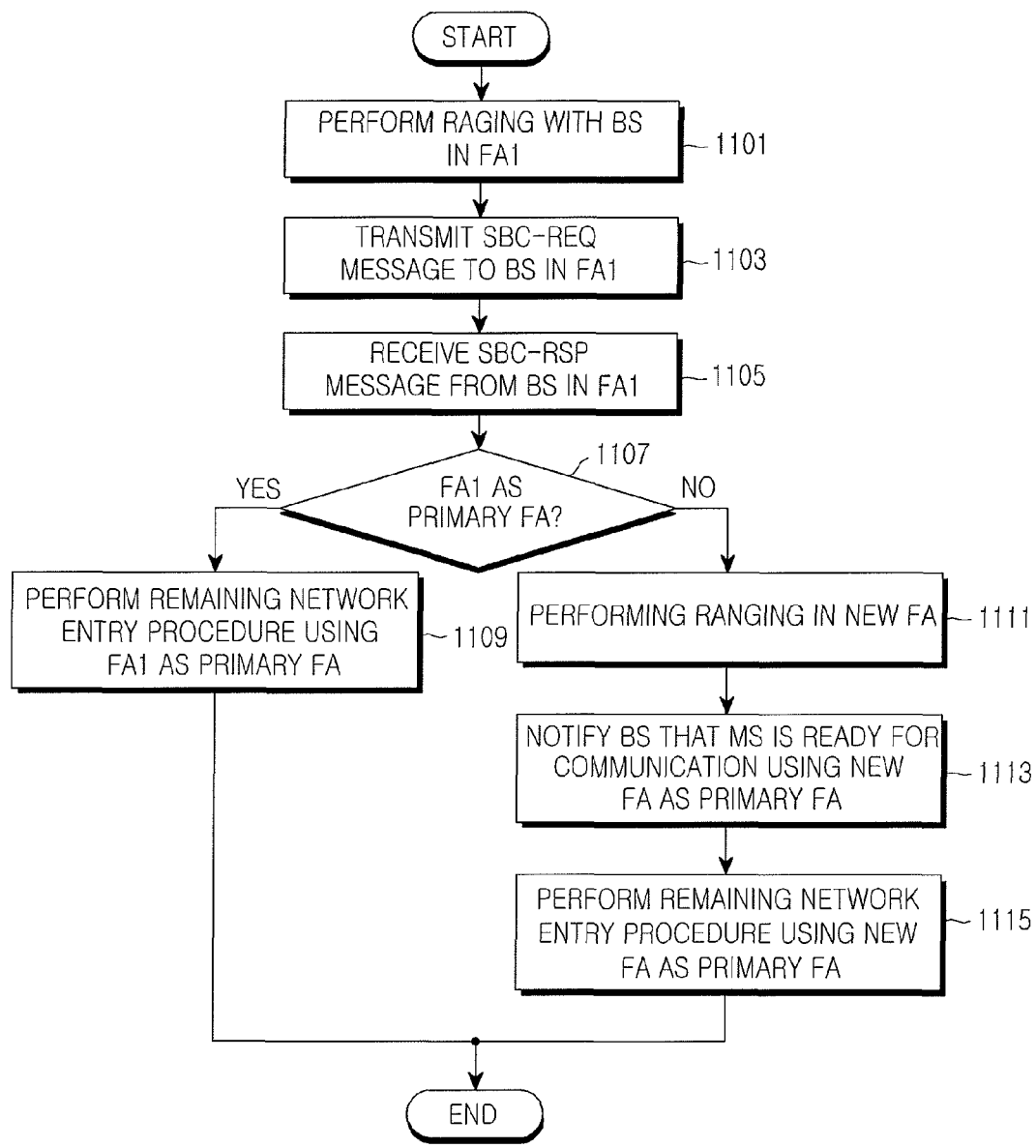
FIG. 11 is a flowchart of a network entry operation of the MS when the MS receives a default FA change command according to a third exemplary embodiment of the present invention.

FIG. 11 is a flowchart of a network entry operation of the MS when the MS receives a default FA change command according to a third exemplary embodiment of the present invention.

Referring to FIG. 11, the MS performs initial ranging with the BS in a default bad, FA1 in step 1101 and transmits an SBC-REQ message to the BS in FA1 in step 1103. In step 1105, the MS receives an SBC-RSP message from the BS. In step 1107, the MS determines whether the SBC-RSP message includes information commanding change of the default FA from FA1 to a new FA. If there is no need to change the default FA FA1, the MS continues the network entry with the BS in FA1 in step 1109.

On the other hand, if the MS is to change the default FA from FA1 to a new FA, it performs ranging in the new FA indicated by the BS in step 1111 and notifies the BS that it is ready for communications in the new FA as the primary FA in step 1113. The notification can be made by a bandwidth request header with a bandwidth request field set to 0. In step 1115, the MS performs the remaining network entry with the BS in the new FA.

As is apparent from the above description, the present invention advantageously enables transmission and reception of a large amount of data by supporting multiple FAs to an MS in a wireless communication system.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for changing frequency assignment (FA) by a base station (BS) in a wireless communication system, the method comprising:
    transmitting, to a mobile station (MS), an FA changing message using a serving primary FA, the FA changing message indicating the MS to change the serving primary FA to a target primary FA, which is one of a plurality of FAs managed by the BS; and
    if a response message in a response to the FA changing message is received from the MS, changing the serving primary FA to the target primary FA at a time according to start time information about a data communication,
    wherein the FA changing message includes index information of the target primary FA and the start time information about the data communication, and
    wherein the start time information comprises information about a start time of the data communication in the target primary FA.

2. The method of claim 1, wherein the target primary FA is determined based on a quality measurement value of the plurality of FAs reported by the MS.

3. The method of claim 2, wherein the quality measurement value includes a quality measurement value of respective FAs used by the MS or a value of respective FAs unused for communications with the BS.

4. The method of claim 1, wherein changing the serving primary FA to the target primary FA comprises:
    performing a ranging procedure with the MS on the target primary FA, based on a ranging indicator; and
    if the response message is received from the MS on the target primary FA, changing the serving primary FA to the target primary FA in the time according to the start time information,
    wherein the ranging indicator indicates whether to perform the ranging procedure on the target primary FA, and is included in the FA changing message.

5. The method of claim 1, further comprising:
    if it is determined that the MS can use a plurality of FAs based on first information, determining a number of FAs to be allocated the MS according to second information;
    selecting FAs based on the number of FAs;
    transmitting, to the MS, FA information including information about indexes of the selected FAs and information about a start time in which data communication starts in the selected FAs; and
    communicating with the MS according to the start time in the selected FAs,
    wherein the first information indicates whether the MS can use the plurality of FAs, and the second information includes information about the number of FAs that can be allocated to the MS.

6. The method of claim 1, further comprising:
    transmitting, to the MS, at least one of information indicating whether the BS supports a mode for using at least two FAs, information about indexes of total FAs managed by the BS and a center frequency of each of the total FAs.

7. The method of claim 1, further comprising, if the BS is a serving BS for the MS:
exchanging BS information with at least one neighbor BS of the serving BS;
transmitting, to the MS, neighbor BS information including FA information about each of the at least one neighbor BS in the target primary FA in use for communications with the MS;
exchanging information with a handover candidate BS upon receipt of a handover request message including information about the handover candidate BS in the target primary FA from the MS;
transmitting, to the MS, a handover response message including the exchanged information in the target primary FA;
exchanging a context of the MS with a final target neighbor BS, upon receipt of a message including information about the final target neighbor BS in the target primary FA from the MS; and
exchanging the context of the MS with the final target neighbor BS during network re-entry between the MS and the final target neighbor BS,
wherein the information exchanged with the handover candidate BS includes at least one of information indicating whether the MS supports a mode for using at least two FAS, a maximum number of FAs supported by the MS, and information about a service level provided to the MS.

8. A method for changing frequency assignment (FA) by a mobile station (MS) in a wireless communication system, the method comprising:
receiving, from a base station (BS), an FA changing message using a serving primary FA, the FA changing message indicating the MS to change the serving primary FA used by the MS to a target primary FA, which is one of a plurality of FAs managed by the BS; and
transmitting a response message to the BS, and switching the serving primary FA to the target primary FA at a start time,
wherein the FA changing message includes index information of the target primary FA and information about the start time.

9. The method of claim 8, wherein the target primary FA is determined based on a quality measurement value of the plurality of FAs, transmitted to the BS.

10. The method of claim 9, wherein the quality measurement value includes a quality measurement value of respective FAs used by the MS or a value of respective FAs unused for communications with the BS.

11. The method of claim 8, wherein transmitting the response message and changing the serving primary FA to the target primary FA comprises:
performing a ranging procedure with the BS on the target primary FA, based on a ranging indicator; and
if the target primary FA is ready, transmitting the response message to the BS, and changing the serving primary FA to the target primary FA in the time according to the start time information,
wherein the ranging indicator indicates whether to perform the ranging procedure on the target primary FA, and is included in the FA changing message.

12. A base station (BS) for changing frequency assignment (FA) in a wireless communication system, the BS comprising:
a transceiver configured to:
transmit, to a mobile station (MS), an FA changing message using a serving primary FA, the FA changing message indicating the MS to change the serving primary FA to a target primary FA, which is one of a plurality of FAs managed by the BS, and
receive a response message from the MS; and
a controller configured to, if the response message is received, switch the serving primary FA to the target primary FA at a start time,
wherein the FA changing message includes index information of the target primary FA and information about the start time.

13. The BS of claim 12, wherein the target primary FA is determined based on a quality measurement value of the plurality of FAs reported by the MS.

14. The BS of claim 13, wherein the quality measurement value includes a quality measurement value of each FA used by the MS or a value of respective FAs unused for communications with the BS.

15. The BS of claim 12, wherein the controller performs a ranging procedure with the MS on the target primary FA, based on a ranging indicator, and if the response message is received from the MS on the target primary FA, changes the serving primary FA to the target primary FA in the time according to the start time information,
wherein the ranging indicator indicates whether to perform the ranging procedure on the target primary FA, and is included in the FA changing message.

16. A mobile station (MS) for changing frequency assignment (FA) in a wireless communication system, the MS comprising:
a transceiver configured to:
receive, from a base station (BS), an FA changing message using a serving primary FA, the FA changing message indicating the MS to change the serving primary FA used by the MS to a target primary FA, which is one of a plurality of FAs managed by the BS, and
transmit a response message to the BS; and
a controller configured to switch the serving primary FA to the target primary FA at a start time,
wherein the FA changing message includes index information of the target primary FA and information about the start time.

17. The MS of claim 16, wherein the target primary FA is determined based on a quality measurement value of the plurality of FAs, transmitted to the BS.

18. The MS of claim 17, wherein the quality measurement value includes a quality measurement value of each FA used by the MS or a value of respective FAs unused for communications with the BS.

19. The MS of claim 16, wherein the controller performs a ranging procedure with the BS on the target primary FA, based on a ranging indicator, if the target primary FA is ready, transmits the response message to the BS by controlling the transceiver, and changes the serving primary FA to the target primary FA in the time according to the start time information,
wherein the ranging indicator indicates whether to perform the ranging procedure on the target primary FA, and is included in the FA changing message.

* * * * *